United States Patent
Zhao et al.

(10) Patent No.: US 7,024,290 B2
(45) Date of Patent: Apr. 4, 2006

(54) ACTIVE MOTOR DAMPING TO MITIGATE ELECTRIC VEHICLE DRIVELINE OSCILLATIONS

(75) Inventors: Yifan Zhao, Belleville, MI (US); Michael Schneider, Bloomfield Township, MI (US); Dale Crombez, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/903,326

(22) Filed: Jul. 30, 2004
(Under 37 CFR 1.47)

(65) Prior Publication Data
US 2006/0025905 A1     Feb. 2, 2006

(51) Int. Cl.
*G06F 17/00* (2006.01)
*B60K 6/04* (2006.01)

(52) U.S. Cl. ............................ 701/22; 701/38; 701/71; 701/91; 180/65.6

(58) Field of Classification Search .................. 701/22, 701/38, 71, 82, 84, 87, 80, 90, 91; 180/65.6, 180/65.8, 197, 446; 318/114, 802
See application file for complete search history.

(56) References Cited

U.S. PATENT DOCUMENTS

| | | | |
|---|---|---|---|
| 4,766,967 A | 8/1988 | Slicker et al. | |
| 5,534,764 A * | 7/1996 | Masaki et al. | 318/802 |
| 5,864,770 A | 1/1999 | Ziph et al. | |
| 6,193,628 B1 | 2/2001 | Hrovat et al. | |
| 6,196,345 B1 | 3/2001 | Lyons et al. | |
| 6,334,424 B1 | 1/2002 | Ito | |
| 6,490,518 B1 * | 12/2002 | Walenty et al. | 701/71 |
| 6,547,022 B1 * | 4/2003 | Hosomi et al. | 180/197 |
| 6,574,535 B1 | 6/2003 | Morris et al. | |
| 6,600,980 B1 * | 7/2003 | Kraska et al. | 701/22 |
| 6,720,746 B1 * | 4/2004 | Amann et al. | 318/114 |
| 6,742,620 B1 * | 6/2004 | Eidam et al. | 180/446 |
| 2001/0032045 A1 * | 10/2001 | Hano et al. | 701/80 |

FOREIGN PATENT DOCUMENTS

EP          1077150 A2     8/1999

* cited by examiner

*Primary Examiner*—Tan Q. Nguyen
(74) *Attorney, Agent, or Firm*—David Kelley; Tung & Associates (57) ABSTRACT

A system and method for actively damping driveline oscillations in a motor vehicle having a traction motor to drive a vehicle's drive wheels and an antilock brake system (ABS). A traction motor controller controls a torque output signal of the motor to effectively to dampen driveline oscillations during an ABS operation. A proportional, a proportional derivative, or a derivative controller may be used to generate the torque output signal based on at least one of motor speed, an average of the drive wheel speeds, a difference in the two speeds, a motor angular acceleration, an average wheel angular acceleration, and a difference in the angular accelerations. Motor speed signals and average drive wheel speed signals may be filtered to eliminate high frequency components of each speed signal. Additionally, amplitude of the torque output signal may be limited within a positive upper and a negative lower active motor damping limit.

18 Claims, 5 Drawing Sheets

Figure 6

ACTIVE MOTOR DAMPING TO MITIGATE ELECTRIC VEHICLE DRIVELINE OSCILLATIONS

FIELD OF THE INVENTION

The present invention generally relates to active motor damping technology and more particularly, relates to a motor control system and method for mitigating unwanted oscillation signals in a driveline of a motor vehicle.

BACKGROUND OF THE INVENTION

The need to reduce fossil fuel consumption and emissions in automobiles and other vehicles predominately powered by internal combustion engines (ICEs) is well known. Vehicles powered by electric motors attempt to address these needs. Another alternative solution is to combine a smaller ICE with electric motors, such as an electric traction motor into one vehicle. Such vehicles combine the advantages of an ICE vehicle and an electric vehicle and are typically called Hybrid Electric Vehicles (HEVs).

The HEV is described in a variety of configurations. Many HEV patents disclose systems where an operator is required to select between electric and internal combustion operation. In other configurations, the electric motor drives one set of wheels and the ICE drives a different set.

Other, more useful, configurations have developed. For example, a series hybrid electric vehicle (SHEV) configuration is a vehicle with an engine (most typically an ICE) connected to an electric motor called a generator. The generator, in turn, provides electricity to a battery and another motor, called a traction motor. In the SHEV, the traction motor is the sole source of wheel torque. There is no mechanical connection between the engine and the drive wheels. A parallel hybrid electrical vehicle (PHEV) configuration has an engine (most typically an ICE) and an electric motor that work together in varying degrees to provide the necessary wheel torque to drive the vehicle. Additionally, in the PHEV configuration, the motor can be used as a generator to charge the battery from the power produced by the ICE.

A parallel/series hybrid electric vehicle (PSHEV) has characteristics of both PHEV and SHEV configurations and is sometimes referred to as a "split" parallel/series configuration.

In one of several types of PSHEV configurations, the ICE is mechanically coupled to two electric motors in a planetary gear-set transaxle. A first electric motor, the generator, is connected to a sun gear. The ICE is connected to a carrier gear. A second electric motor, a traction motor, is connected to a ring (output) gear via additional gearing in a transaxle. Engine torque can power the generator to charge the battery. The generator can also contribute to the necessary wheel (output shaft) torque if the system has a one-way clutch. The traction motor is used to contribute wheel torque and to recover braking energy to charge the battery. In this configuration, the generator can selectively provide a reaction torque that may be used to control engine speed. In fact, the generator motor and the planetary gear-set can provide a continuous variable transmission (CVT) effect between the engine and the wheels. Further, the HEV presents an opportunity to better control engine idle speed over conventional vehicles by using the generator to control engine speed.

In traditional, non-HEV's, a common method to prevent unwanted driveline oscillations is to use an alternator generator as a counter-torque to eliminate driveline oscillations. For example, European Patent Publication EP 1077150A2 issued to Hrovat et. al. ("Hrovat Publication") disclose various methods of utilizing a vehicle's starter/alternator to generate torque to power electrical devices. However, the Hrovat Publication does not apply to HEV's because the HEV does not require an alternator. An HEV already has a ready source of electrical power within its battery and can generate additional power with an onboard generator. Additionally the Hrovat Publication does not disclose use of a traction motor to control oscillations in the driveline, particularly during an ABS operation.

However, in the design of vehicles powered by electric motors it is desirable to have a high gear ratio that allows the motor to spin much faster than the wheels. A disadvantage of a high gear ratio is that it amplifies the value of motor inertia that is reflected to the wheels.

During antilock braking operations, the rapid cycling of the wheel speeds coupled with the high reflected motor inertia may cause deflections in the driveline. The resulting oscillation can cause unpleasant NVH and damage to driveline components or mounts.

One method of reducing unwanted oscillations is to either reduce mass of motor or to use a smaller gear ratio to decrease driveline deflections, however, this solution decreases the efficiency or effectiveness of the electric motor.

It is beneficial, economical, and efficient to have an apparatus, system and method that incorporates an HEV traction motor controller to output a counter-torque with the ability to damp out unwanted oscillations resulting from motor inertia in the driveline, particularly during an ABS operation.

It is common for vehicle traction motor controllers to include some sort of torque oscillation control feature in a motor torque control strategy. However, existing methods may operate to damp out driveline oscillations that occur during normal driving modes due to chassis vibrations or the like. The need to reduce oscillations that are induced by motor inertia of an electric motor in the driveline of a vehicle during an ABS operation remains unmet.

SUMMARY OF THE INVENTION

The present invention provides an active motor damping system and method that operates to mitigate driveline oscillations in a motor vehicle during an ABS operation.

The present invention advantageously provides a system and method that uses the traction motor that is controlled by a motor controller to output a torque capable of actively damping out unwanted oscillations resulting from deflection of a vehicle's driveline due to traction motor inertia during an ABS operation.

Generally, active motor damping, as it is defined herein is the subject of the present invention. Active motor damping can be achieved by generating motor torque that is proportional to at least one of: a difference in the motor speed and the average of the wheel speeds, angular acceleration of the motor rotor, an average of the angular accelerations of the wheels, and a difference in the angular acceleration of the motor rotor and the average angular acceleration of the wheels, or by a combination of these factors.

The present system and method advantageously operates to maintain a true zero torque on a vehicle driveline by determining a traction motor torque command effective to actively dampen drivetrain oscillations during an ABS operation when the antilock braking system (ABS) is active at at least one of the drive wheels. As defined herein, an oscillation may be a vibration in the driveline and in associated components.

When an ABS event occurs, the present invention operates to apply a current to the traction motor to generate a desired associated output torque signal that effectively dampens unwanted oscillations in the driveline.

In a preferred embodiment, the present invention provides an electric machine, preferably a traction motor, in a motor vehicle that provides a drive force to drive at least two drive wheels on a motor vehicle. The motor vehicle preferably has a driveline that has at least one driveshaft driven by an output of the electrical machine, the at least one driveshaft has a driven end driven by the electric machine and an end coupled to a differential in communication with at least one, but preferably two drive wheels. Additionally, the motor vehicle has an ABS system having an ABS controller that cooperates with a traction motor controller to control torque of the traction motor to dampen unwanted driveline oscillations caused by inertia of the traction motor during an ABS event.

Additionally, the present invention senses a rotational speed of the motor and senses rotational speeds of the at least two drive wheels.

As the motor and wheels are spinning during an ABS operation, a rotational speed of the motor at the wheels is calculated by dividing the sensed motor speed by a predefined gear ratio that exists between the motor and the drive wheels.

An average wheel speed of the drive wheels is calculated by dividing the sum of the sensed speeds of each of the drive wheels by the number of drive wheels sensed.

At least one of the calculated motor speed and average wheel speed values are put input into at least one of a proportional controller, a proportional-derivative controller, and a derivative controller to control the motor output torque signal of the traction motor and thus to control torque on the driveline.

In an embodiment using a proportional controller the traction motor is controlled to provide a motor output torque signal which is based on the difference between average wheel speed and the traction motor speed at the wheels during an anti-lock braking operation, wherein the difference between average wheel speed and the traction motor speed at the wheels during an anti-lock braking operation is called a speed error.

In an embodiment using a proportional derivative (PD) controller, the proportional part of the proportional derivative controller operates the same as the proportional controller disclosed herein, however, the PD controller additionally determines a derivative of the sensed and calculated motor and wheel speeds to improve the effectiveness of active motor damping.

Thus, the proportional portion of the PD controller uses terms based on the speed error and the derivative portion of the PD controller uses terms based on at least one of the motor angular acceleration, average wheel angular acceleration, and a difference between the average wheel angular acceleration and the motor angular acceleration as seen at the drive wheels to provide a desired motor output torque signal.

In an alternative embodiment using a derivative controller, the traction motor is controlled to provide a motor output torque signal which is based on at least one of a derivative of the rotational motor speed at the drive wheels (motor angular acceleration), a derivative average wheels speed of the drive wheels (average wheel acceleration), and the difference between the motor angular acceleration at the drive wheels and average wheel acceleration during an anti-lock braking operation.

In a preferred embodiment, an active motor damping limit (AMDL) may be selected from at least one of a positive or upper AMDL and a negative or lower AMDL, wherein the positive AMDL and the negative AMDL may be different values. Then, at least one of the positive AMDL or negative AMDL may be optionally applied to the calculated torque to control or limit amplitude of the output torque signal.

Additionally, filters may be applied to the calculated average wheel speeds and the calculated motor speed at the wheels to eliminate high frequency components of both the wheel speed signals and the motor speed signal.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENTS

The present invention provides a system and method of using torque control to mitigate or to eliminate unwanted oscillation signals in a driveline of a motor vehicle.

The present invention relates to any vehicle having an electric drive motor or machine such as a traction motor that provides a drive force to drive at least one, but preferably, two drive wheels. The electric drive motor is controlled by an electric drive motor controller and wherein the vehicle further has an anti-lock braking system having an ABS controller that is in further communication with the electric motor controller. The vehicle is preferably an electrically propelled vehicle such as an electric vehicle (EV), a hybrid electric vehicle (HEV), or fuel cell electric vehicle (FCEV).

Figure 1:
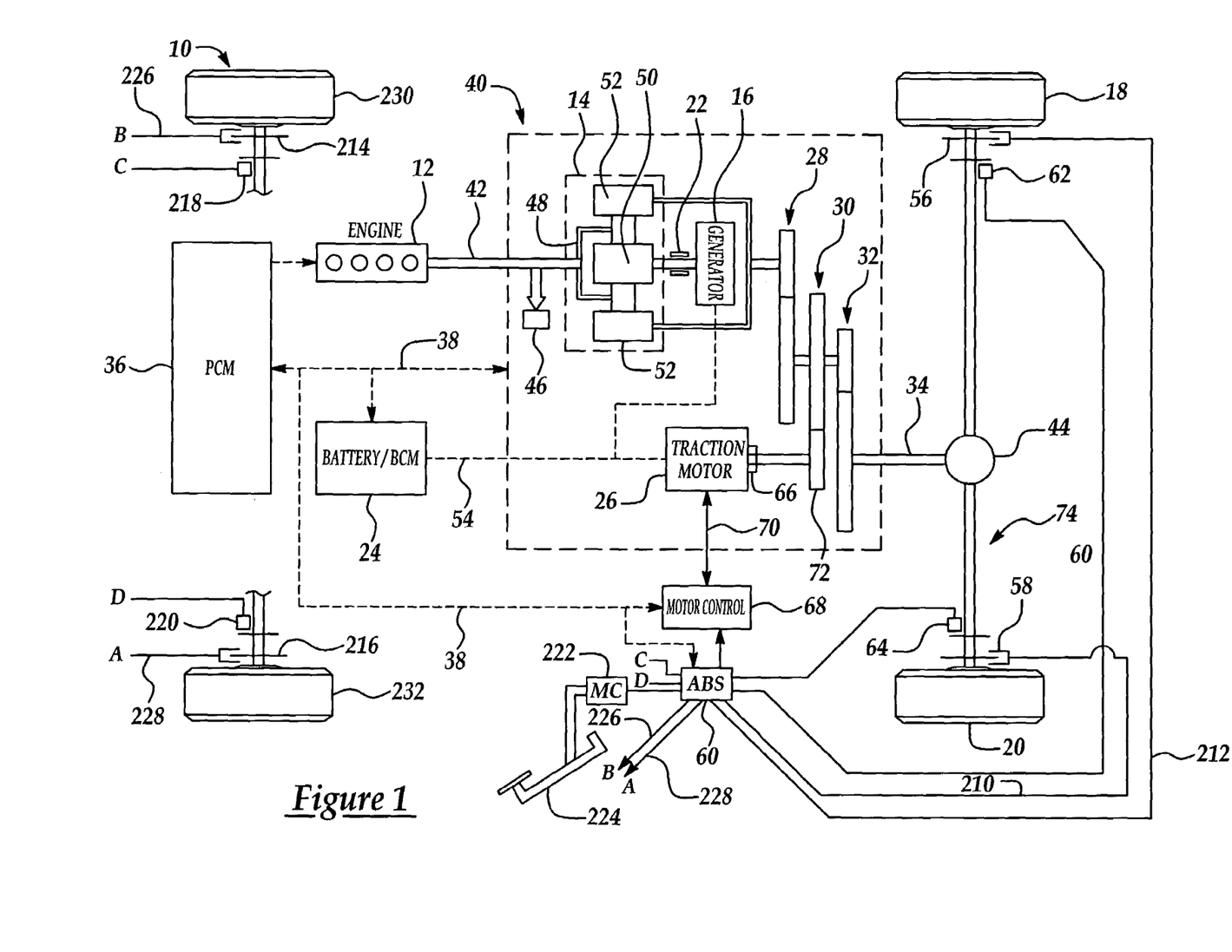
FIG. 1 is a block diagram of a powertrain system in accordance with a preferred embodiment of the present invention.

The present invention provides a system to continuously control torque output of the electric machine to eliminate oscillations that occur from the electric machine's own inertia, preferably during an ABS operation. FIG. 1 demonstrates just one possible configuration, specifically a parallel/series hybrid electric vehicle (torque split) configuration.

However, it is contemplated that the electric machine may be interposed between a battery and a drive shaft, wherein the electric machine is mechanically coupled to the drivetrain of the vehicle.

Referring to FIG. 1, an illustration of a block diagram of a motor vehicle powertrain system of a motor vehicle, such as a hybrid electric vehicle (HEV), including a traction motor.

FIG. 1 demonstrates one configuration of a powertrain system 10 for a Parallel/Series Hybrid Electric Vehicle (PSHEV) ("torque splitting") configuration. The basic makeup of the vehicle includes: An Engine 12 is connected to a Planetary Gear set 14. The Planetary Gear Set 14 mechanically couples a carrier gear 48 to the engine 12 via a one-way clutch 46. The planetary gear set 14 also mechanically couples a sun gear 50 to a generator motor 16 and a ring (output) gear 52. Thus, the Planetary Gear set 14, splits Engine output energy into a series path, from the Engine 12 to the Generator Motor 16, and a parallel path, from the Engine 12 to driving Wheels 18, 20. The engine speed (RPM) can be controlled by varying the split to the series path, while maintaining the mechanical connection through the parallel path. The Generator Motor 16 is connected to a Generator Brake 22 and a first gear set 28. The Generator Motor 16 is electrically connected to a Battery 24, preferably through a link 54 and is capable of charging the Battery 24. An Electric machine 26, such as a traction motor, augments the engine 12 on the parallel path through a Second Gear Set 30. A third gear set 32 is connected to the second gear set 30 and to a driveshaft 34. The electric motor 26 also provides the opportunity to use energy directly from the series path, essentially drawing from the power created by the Generator Motor 16, thereby reducing the losses associated with converting energy into and out of chemical energy in the battery 24.

The powertrain system 10 of a PSHEV may be under the control of a powertrain control module (PCM) 36, a name that is sometimes given to an electronic module that processes certain data to control various aspects of powertrain system operation via a communication bus 38.

A transmission 40 is preferably an automatic transmission such as a "step ratio" planetary gear transmission or a continuously-variable transmission (not shown). In FIG. 1, transmission 40 is actually a transaxle for a front wheel drive vehicle. Transmission 40 drives the driveshaft 34 coupled to drive wheels 18,20 through a differential 44 of the vehicle, and the transmission 40 is driven by shaft 42 interposed between the engine 12 and the transmission 40.

Clutches may also be provided between the engine 12 and the traction motor 26 and between the traction motor 26 and the generator motor 16, depending upon the exact functionality desired of the hybrid vehicle's powertrain.

An electric drive vehicle typically employs some form of mechanical service brakes, such as friction brakes 56, 58, 216, 214 at individual wheels 18, 20, 230, 232, respectively.

Mechanical friction brakes may be hydraulic-, pneumatic-, or electric-operated.

It is known to use an electronic brake controller (not shown) to apply relative proportions of regenerative braking and friction braking when braking is called for.

The brakes 56, 58, 214, 216 are preferably in communication with a master cylinder 222 that receives a brake signal from a brake pedal 224. The master cylinder 222, and the brakes are in further communication with an ABS controller via a plurality of brake lines, shown in FIG. 1 as front and rear brake lines (210, 212, 226, and 228, respectively).

The braking system preferably includes an anti-lock capability embodied in an anti-lock brake system (ABS) that is effective to sense incipient wheel lock-up and modulate the application of the friction brakes 56, 58, 214, 216 in a way that seeks to avoid wheel lock-up and resulting skidding that could possibly lead to loss of vehicle control during certain braking operations. Various types of anti-lock brake systems are presently in commercial use.

An ABS controller 60 receives ABS event data from the master cylinder 222, the plurality of brake lines 210, 212, 226, 228, and from at least one wheel speed sensor selected from rear wheel speed sensors 218, 220 and front wheel speed sensors 62, 64. The individual wheels 230, and 232 are shown in FIG. 1 as being in communication with the ABS controller 60 via links A, B, C, and D.

For purposes of illustration, in a two-wheel drive configuration as shown in FIG. 1, the wheels 230, 232 are non-driven wheels and the wheels 18,20 are the driven wheels. However, in a four-wheel or all-wheel drive configuration, the wheels 230, 232 may also be drive wheels.

In the preferred embodiment shown in FIG. 1, the driven wheels 18, 20 are steerable and are positioned toward the front of the vehicle while the non-driven wheels 230, 232 are positioned toward the rear of the vehicle. In a front wheel drive arrangement, shown in FIG. 1, wheel speed sensors 62, 64 sense the rotational wheel speeds of driven wheels 18, 20. A motor control speed sensor 66 senses the rotational speed of the traction motor 26. The signals of each of the above sensors are made available to a traction motor controller 68, either by hard-wiring 70 (sensing the traction motor sensor) or through at least one data communication link from other module(s) to which the sensors are directly coupled.

Additionally, in a rear wheel drive, or an all-wheel drive vehicle, wheel speed sensors 218, 220 sense the rotational speeds of wheels 230, 232 and communicate the speeds to the ABS controller 60.

Sometimes the electric machine 26 operates as a motor that makes a positive torque contribution to powertrain torque. At other times the electric machine operates as a generator that makes a negative torque contribution to powertrain torque. Positive torque contribution from the electric machine may appear as traction torque delivered through a drivetrain of the vehicle to at least some of the wheels to propel the vehicle. Negative torque contribution from the electric machine imposes braking torque on the drivetrain to brake the vehicle.

The traction motor 26 is mechanically coupled to a gear 72 of the second gear set 30 and is electrically linked to the battery 24 via link 54. The gear 72 of the second gear set 30 and the traction motor 26 are mechanically coupled to drive wheels 18, 20 via the output driveshaft 34 that is mechanically coupled to the differential 44 associated with a front axle 74 having the drive wheels 18, 24.

The traction motor 26 also provides the opportunity to use energy directly from the series path, essentially running off power created by the generator motor 16. This reduces losses associated with converting energy into and out of chemical energy in the battery 24 and allows all engine energy, minus conversion losses, to reach the drive wheels 18, 20.

The traction motor may be any electric machine design that operates to drive at least one drive wheel in a vehicle. However, as shown in the present embodiment, the traction motor provides a drive force to drive at least two drive wheels in a vehicle. The traction motor is controlled by control module 68 having control logic. It should be recognized that many sensors for effecting such control are not shown in FIG. 1, as they are not germane to the present invention and need for them will be readily recognized by those of ordinary skill in the art.

FIG. 1 illustrates one possible configuration of the present invention by way of a block diagram of a hybrid electric vehicle having a traction motor 26 and traction motor controller 68 utilizing features of the present invention. As stated above, the motor controller 68 can be housed within the PCM 36 or as a separate controller 68. This controller 68 can generally include a simple proportional feedback controller. Alternatively, this controller can generally include a simple proportional-derivative feedback controller. In another alternative embodiment, the controller can generally include a simple derivative feedback controller.

Controller 68 also preferably includes control circuitry for control of the traction motor 26. The motor controller 68 can receive input from various vehicle component sensors, including, but not limited to: at least one wheel speed sensor selected from at least one of the two driven wheel speed sensors 62, 64 (in a front-wheel or four-wheel drive configuration) or wheel speed sensors 218, 229 (in a rear-wheel or four wheel drive configuration), traction motor speed sensor 66 and ABS operation data.

The motor controller 68 of the present invention can be physically located either within the PCM 36 or as a stand-alone unit (as shown in FIG. 1).

In general, the controller 68 operates to continuously monitor vehicle inputs selected from at least one of wheel speeds, derivative of wheel speeds (wheel acceleration), traction motor rotational speeds, derivative of traction motor rotation speeds (traction motor acceleration), and ABS operation data. The controller correspondingly commands a desired traction motor torque corresponding to at least one of motor speed, motor acceleration, wheel speed, wheel acceleration, a difference in motor speed and wheel speed, and a difference in motor acceleration and wheel acceleration during an ABS braking operation.

Thus, an electric machine, such as a traction motor can be positioned to provide a driving torque to the differential, in an embodiment having at least one traction motor associated with driving at least two drive wheels. Alternatively, in an alternative embodiment, the at least one traction motor can be positioned to directly drive at least one drive wheel. The traction motor can apply torque corrections in accordance with a control method to suppress or cancel the torque oscillations occurring in the driveline due to motor inertia of the traction motor. The control method may be performed anytime during operation of a vehicle, preferably upon occurrence of an ABS braking operation.

As the motor and wheels are spinning, preferably during an ABS operation, both a rotational speed of the motor and an average wheel speed of each drive wheel are sensed and calculated and these values are put into at least one of a proportional controller, a proportional-derivative controller, and a derivative controller to maintain a zero torque on the driveline.

Generally, the present invention uses feedback control algorithms to monitor and dynamically modify a torque command output from a traction motor to damp out unwanted driveline oscillations caused by the traction motor's own inertia, preferably during an ABS braking operation.

The driveline oscillations can be reduced or eliminated by controlling traction motor torque to produce an output torque that effectively damps out the oscillations.

Active Motor Damping, as it is defined herein is the subject of the present invention. Active Motor Damping can be achieved by generating motor torque that is proportional to at least one of a difference in the motor speed and the average of the wheel speeds, angular acceleration of the motor rotor, and an average of the angular accelerations of the driven wheels, or by a combination of these factors.

The algorithms illustrated in FIGS. 2–7 can be used for a two-wheel drive, front wheel drive vehicle, or an all wheel-drive vehicle.

FIGS. 2–7 illustrate the determination of a traction motor torque command effective to dampen drivetrain oscillations during an ABS operation (i.e. when the antilock braking system (ABS) is active at at least one of the drive wheels) according to several embodiments of the present invention.

More particularly, FIGS. 2–7 show a flow diagram depicting algorithms executed by the PCM and the ABS controller 60 that has its own processor that have steps that operate to damp out unwanted driveline oscillations. Communication of electronic data between various devices in the vehicle, including PCM, and the ABS controller 60, occurs via a communication, or data, bus 38 (FIG. 1) on which data is broadcast at suitable update rates. The ABS controller 60 utilizes wheel speed sensor information 62, 64 as a data input for calculating wheel slip. Certain characteristics of wheel slip and wheel deceleration indicative of an incipient wheel lock-up will activate the ABS system through the ABS controller 60. Additionally, during occurrence of an ABS operation, unwanted oscillations in the driveline 34 occur due to motor inertia of the traction motor 26.

The rotational speed of the motor 26 is sensed by the motor speed sensor 66, and the wheel speeds Wh1, Wh2 of each of the drive wheels 18, 20 are sensed by the wheel speed sensors 62, 64, respectively. The gear sets 30,32 provide for speed ratio changes between the motor 26 and the wheels 18, 20. The rotational motor speed is converted to speed at the wheels by dividing the motor speed by a predefined gear ratio. The average wheel speed of the at least two drive wheels 18, 20 is calculated by dividing the sum of each of the drive wheel speeds by the number of drive wheels. In the case of a four wheel drive or an all wheel drive vehicle in which all four wheels are connected to the motor during ABS operation, the four wheel speeds would have to be factored in appropriately to compute the average of the wheel speeds.

If the speed difference between the wheels and the motor is used as the basis for motor damping torque, a proportional controller would calculate the motor torque output signal as a gain multiplied by a difference that is obtained by subtracting the motor angular speed at the wheels from the average of the driven wheel angular speeds.

The controller described above is a proportional controller based on the speed difference. A proportional-derivative (PD) controller based on the speed difference and a derivative of the speed difference could also be used. If a PD controller is used, the proportional part of the controller would be as described with reference to the proportional controller herein, while the derivative portion would contain terms representing the average acceleration of the wheels (i.e., derivative of the average speed of the wheels) and the negative of the motor acceleration (i.e., derivative of the angular motor speed at the wheels), with one of the acceleration terms corrected for the gear ratio as described above.

If the motor angular acceleration is used as the basis for motor damping torque, a derivative controller calculates the motor torque output signal as the product of a gain of a derivative controller Dgain and the motor acceleration.

If an average of the wheel angular accelerations is used as the basis for motor damping torque, the derivative controller calculates the motor torque output signal as the product of the Dgain and the average wheel acceleration.

If a difference in the angular acceleration between the wheels and the motor is used as the basis for motor damp torque, the derivative controller calculates the motor torque output signal as the product of the Dgain and a difference in angular accelerations that is obtained by subtracting the derivative of the motor angular speed from the derivative of the average of the two driven wheel angular speeds.

Additional logic may be used to compensate for controller time delays.

The motor damping torque may be limited within positive and negative limits to limit the time required for motor torque to change between the highest positive torque and the most negative torque. This reduces phase lag of the motor torque because of slew rate limits.

In a preferred embodiment of the present invention a proportional controller is provided to control the output of traction motor torque.

The traction motor is controlled to provide an output torque signal which is based on the difference between the average wheel speed and the traction motor speed at the wheels during an anti-lock braking operation.

Using a proportional controller, the torque is calculated as a gain of the proportional controller, a constant Pgain multiplied by a difference that is obtained by subtracting the motor angular speed at the wheels from the average of the two driven wheel angular speeds.

In a preferred embodiment of the present invention a proportional controller is provided to control the output of traction motor torque.

Upon occurrence of an ABS operation, both drive wheel speeds are measured or sensed, and averaged. A motor speed at the wheels is determined using the sensed motor speed divided by the predefined gear ratio that exists between the motor and the drive wheels.

The difference between the two speeds is the speed error. A calculated torque value based on the speed error is determined. The proportional controller has either a predefined or a variable gain of Pgain. An active motor damping limit (AMDL) selected from at least one of a positive AMDL and a negative AMDL may then optionally be applied to the calculated torque value to control or limit amplitude of the output torque signal. The positive AMDL and the negative AMDL may be different values.

Finally, an actual torque command within the positive or negative AMDL is applied to the motor by the motor controller, and the process repeats again upon occurrence of another ABS operation or event.

Figure 2:
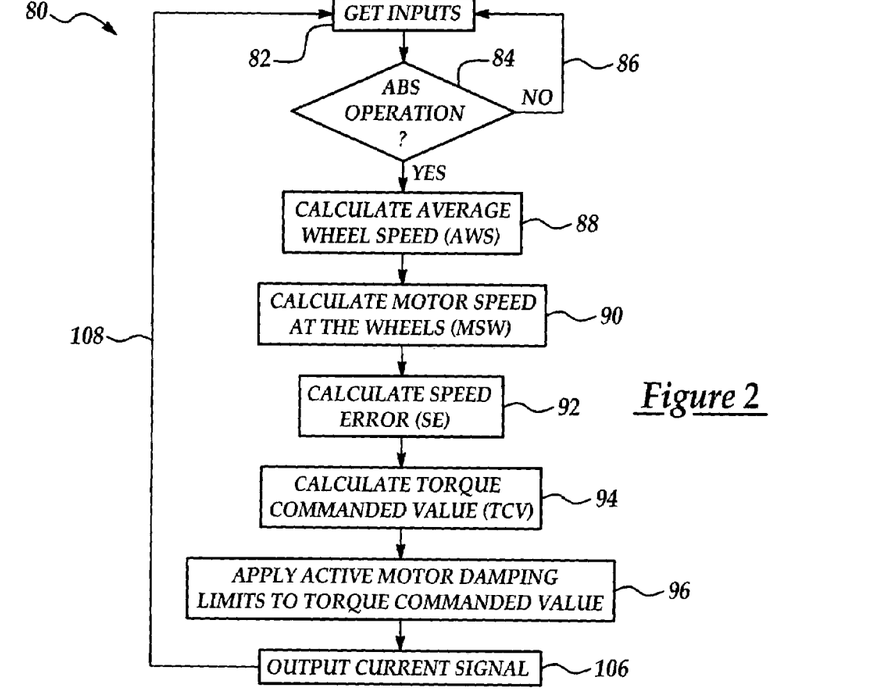
FIG. 2 is a flowchart that depicts steps in an algorithm used to control torque by use of a proportional controller in accordance with a preferred embodiment of the present invention.

More specifically, a preferred embodiment of the present invention is shown in FIG. 2. FIG. 2 is a flowchart 80 that depicts steps in an algorithm used to control motor torque by use of a proportional controller in accordance with a preferred embodiment of the present invention. As shown in FIG. 2, plurality of sensed inputs, including, but not limited to a speed of each of the drive wheels associated with the axle 74, a motor speed (MS) of the electric machine or traction motor 26, and ABS operation data communicated from ABS controller 60 are input into the motor controller 68 (step 82).

The controller then determines whether an ABS operation is occurring (step 84). If no ABS operation has occurred, then the motor controller continuously monitors the inputs until an ABS operation occurs (steps 86, 84).

Upon occurrence of an ABS operation, the average wheel speed (AWS) is determined (step 88) by summing the rotational speeds of each wheel sensed and dividing the sum by the number of wheels sensed. In the present embodiment shown in FIG. 1, an HEV having a front wheel drive power arrangement is provided, the two front wheel speeds Wh1, and Wh2 are summed and then the result of the two speeds is divided by 2.

However, in the case of a four-wheel drive or all wheel drive vehicle in which all four wheels are connected to the motor during ABS operation, the four-wheel speeds would have to be factored in appropriately to compute the average of the wheel speeds.

Next, the motor speed at the wheels (MSw) is determined by dividing the sensed MS by a predetermined gear ratio K (step 90).

A speed error SE is calculated (step 92) to determine a difference between the AWS and the $Ms_w$.

A torque commanded value TCV is calculated (step 94) by multiplying the speed error by the Pgain of the proportional controller.

An active motor damping limit that ranges between a positive active motor damping limit (AMDL) and a negative AMDL may then be optionally applied to the TCV to limit the TVC (step 96). The positive AMDL and the negative AMDL may be different values. The step of applying the active motor damping limit can be accomplished by performing the following substeps, as shown in more detail in FIG. 3: determining whether the TCV is greater than the positive AMDL (step 98); setting the TCV equal to the positive AMDL if the TCV exceeds the positive AMDL (step 100); determining whether the TCV is less than the negative AMDL limit if the TCV is not greater than the positive AMDL (step 102); and setting the TCV equal to the negative AMDL if the TCV exceeds the negative AMDL (step 104).

After applying the AMDL to the TCV (step 96), an output current signal is then applied by the motor controller 68 to the motor 26 (step 106) to generate a desired associated output torque signal within the range of the AMDL effective to dampen unwanted oscillations in the driveline. After the associated output torque signal is generated by the traction motor 26, steps 82–106 are repeated (step 108).

Figure 4:
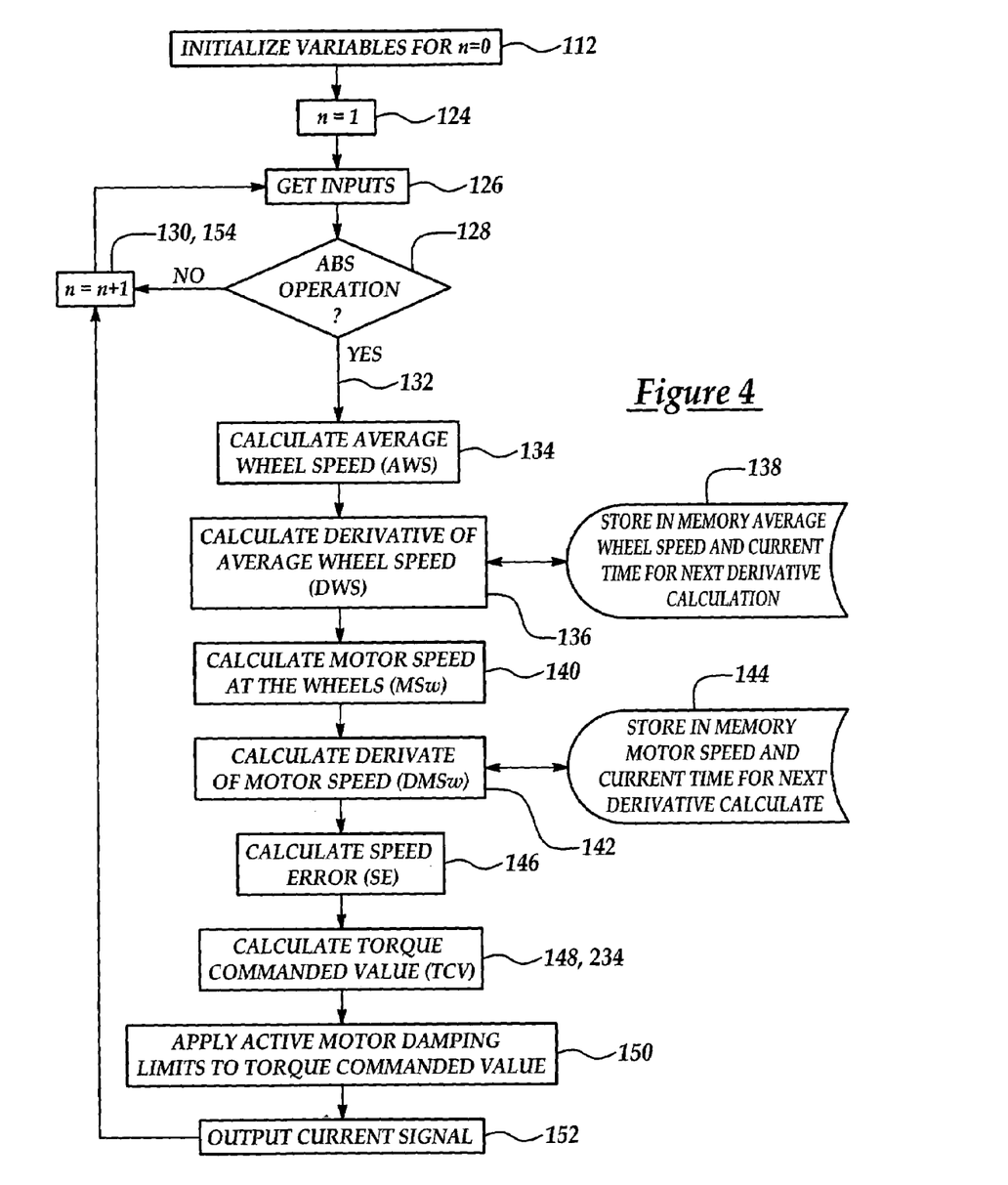
FIG. 4 is a flowchart that depicts steps in an algorithm used to control torque by use of either a proportional derivative controller or a derivative controller in accordance with a preferred embodiment of the present invention.

Generally, FIG. 4 depicts a flowchart 110 that represents an algorithm used to control torque by use of a proportional derivative (PD) controller in accordance with another preferred embodiment of the present invention. In the embodiment using a proportional derivative (PD) controller, the proportional part of the proportional derivative controller operates the same as the proportional controller disclosed herein, however, the PD controller additionally determines a derivative of the sensed and calculated motor and wheel speeds to improve the effectiveness of active motor damping.

Thus, the proportional portion of the PD controller uses terms based on the speed error and the derivative portion of the PD controller uses terms based on at least one of the motor acceleration, average wheel acceleration, and a difference between the average wheel acceleration and the motor acceleration to provide a desired motor output torque signal. Alternatively, a derivative controller may be used to control torque as described further below.

Initially, a plurality of variables are initialized (step 112). The step 112 of initializing the plurality of variables has a plurality of substeps 114, 116, 118, 120, 122, as shown in more detail in FIG. 5. The first substep 114, sets a positive integer n equal to zero. An average wheel speed of the driven wheels at a time t(n), wherein initially a time t(0) is calculated (substep 116), and wherein the average wheel speed at t(0) is defined as AWS(0).

Figure 5:
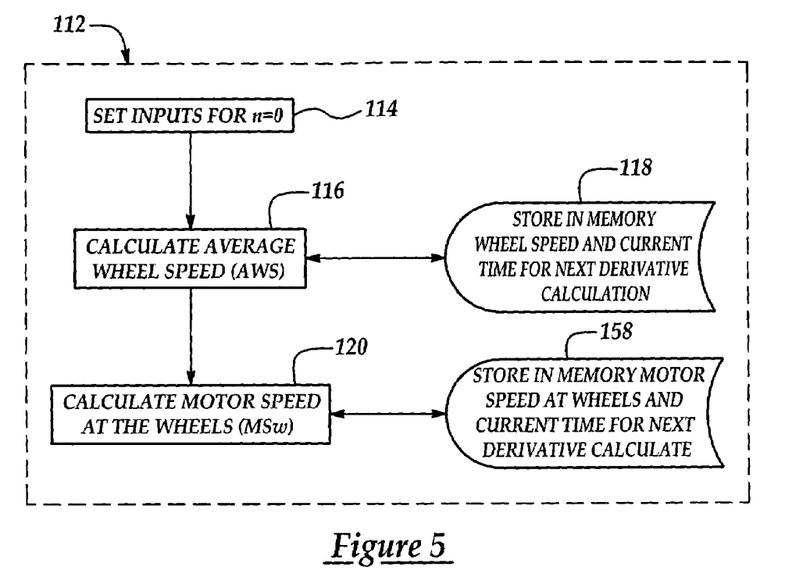
FIG. 5 is a flowchart that depicts initializing variables substeps of step 112 as shown in FIG. 4.

The AWS(0) is then stored (substep 118) in a memory location at time t(0) for use in a first derivative calculation during a first computational cycle.

Another variable MSw(0) representing an initial traction motor speed at the wheels is initialized (substep 120) by dividing an initially sensed motor speed (MS(0)) at time t(0) by a predefined gear ratio K.

The MSw(0) variable is then stored (substep 122) in a memory location at time t(0) in the motor controller 68 for use in a first derivative calculation during a first computational cycle.

After the initialization step 112, n is set equal to a value of one (step 124). After n is set equal to one, a plurality of inputs are input into the motor controller 68 (step 126), wherein the inputs are selected from at least one of two wheel speeds Wh1(n), Wh2(n) sensed by wheel speed sensors 62, 64, respectively, at a time t(n), a motor speed MS(n) of the traction motor 26 sensed by the motor sensor 68 at a time t(n), and ABS operation data sent from the ABS controller 60 at a time t(n).

After receiving inputs as disclosed in step 126, the motor controller 68 then determines whether an ABS operation is occurring (step 128). If no ABS operation has occurred, then the motor controller increments n by one (step 130) and continuously monitors the inputs and repeats steps 126–130 until an ABS operation occurs (step 132).

Upon occurrence of an ABS operation, an average wheel speed (AWS(n)) at a time t(n) is determined by summing the speeds of each wheel sensed, Wh1(n), Wh2(n), and then dividing the sum by the number of wheels sensed. The present embodiment, shown in FIG. 1, provides an HEV having a front wheel drive power configuration, each drive wheel speed is sensed and averaged. Thus, the two front wheel speeds Wh1(n), and Wh2(n) are summed, and then the sum of the two speeds is divided by the number of wheels; in this example, two (step 134).

After determining AWS(n), acceleration of the average wheel speeds DWS is determined (step 136) by calculating the derivative of the AWS(n) with respect to a change in time $\Delta t$, wherein $\Delta t$ is the difference between a current time, t(n) and an earlier time t(n−1). Thus, DWS equals [AWS(n)−AWS(n−1)]/$\Delta t$. The AWS(n) is then stored (step 138) in a memory location of the traction motor controller 68 for use in a next derivative calculation during a next computational cycle.

After the AWS(n) is stored, a determination of the motor speed at the wheels (MSw(n)) at a time t(n) is determined (step 140) by dividing MS(n) by a predefined gear ratio K.

After determining MSw(n), acceleration of the motor speed DMSw is determined (step 142) by calculating the derivative of the MSw(n) with respect to a change in time $\Delta t$, wherein $\Delta t$ is the difference between a current time, t(n) and an earlier time t(n−1). Thus, DMSw equals [MSw(n)−MSw(n−1)]/$\Delta t$. The MSw(n) is then stored (step 144) in a memory location of the traction motor controller 68 for use in a next derivative calculation during a next computational cycle.

If a proportional derivative (PD) controller is used to control torque, a speed error (SE) is then calculated (step 146) to determine the difference in the AWS(n) and the MSw(n).

A torque command is calculated from a commanded value TCV (step 148) based on the speed error and at least one of the motor acceleration (DMSw(n)), average wheel acceleration (DWS), and a difference between the average wheel acceleration and the motor acceleration (DWS-DMSw).

More specifically, the proportional part of the TCV value is calculated step 148 by both multiplying the speed error by a predefined proportional gain, Pgain, of the proportional part of the proportional derivative controller and then summing the result with a predefined derivative gain, Dgain, of the derivative portion of the proportional derivative controller multiplied by at least one of the following DMSw, DWS, and [DWS-DMSw].

However, if a derivative controller is used to control torque, then step 146 that calculates a speed error (SE) is not required.

Additionally, if a derivative controller is used to control torque, then a torque commanded value TCV is calculated (step 234) using at least one of the motor acceleration (DMSw(n)), average wheel acceleration (DWS), and a difference between the average wheel acceleration and the motor acceleration (DWS-DMSw).

More specifically, the TCV value is calculated by multiplying a predefined derivative gain, Dgain, of the derivative controller by at least one of the following DMSw, DWS, and (DWS-DMSw).

Figure 3:
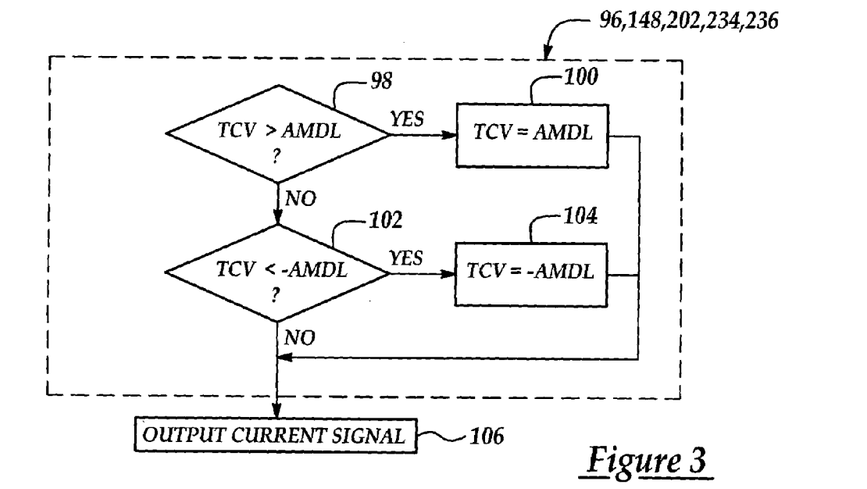
FIG. 3 is a flowchart depicting substeps of step 96 as shown in FIG. 2.

After the TCV value is calculated (step 148 using a PD controller or step 234 using a derivative controller), an active motor damping limit (AMDL) that ranges between a positive AMDL and a negative AMDL is applied to the TCV value (step 150). The positive AMDL and the negative AMDL may be different values. The step 150 of applying the AMDL to the TCV value further has substeps identical to those described with reference to step 96 shown in FIG. 3, thus, the steps 98, 100, 102, 104 used in FIG. 3 are similarly used to describe the substeps of step 150 shown in FIG. 4.

After completing step 150, an output current signal is then applied by the motor controller 68 to the motor 26 (step 152) to generate a desired output torque signal within the range of the AMDL effective to dampen unwanted oscillations in the driveline. After the output current signal is applied to the motor, a generated output signal is output by the traction motor 26 and the value n is incremented by one (step 154) and steps 126–154 are repeated.

Figure 6:
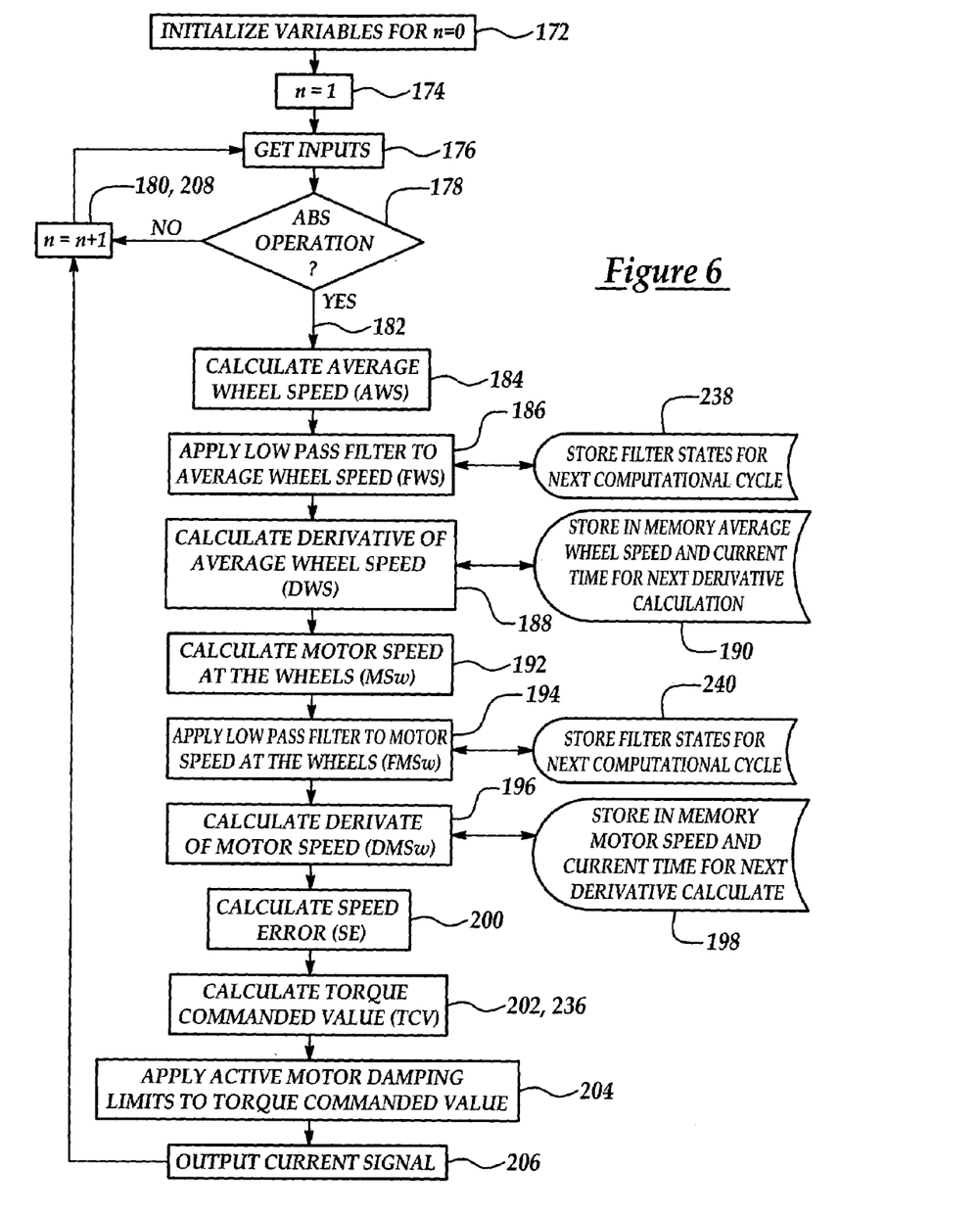
FIG. 6 is a flowchart depicting steps in an algorithm similar to the one shown in FIG. 4, additionally having the steps of applying a low pass filter to an average wheel speed and a motor speed in accordance with a preferred embodiment of the present invention.

In another preferred embodiment shown in FIG. 6, a flowchart 156 depicts an algorithm having steps similar to those disclosed in FIG. 4. However, the algorithm shown in FIG. 6 additionally provides the step of applying an optional filter to both a calculated average wheel speed and to a sensed motor speed. High frequency components of both the wheel speed signals and the motor speed signal may be present in the system due to oscillations occurring upon experiencing an ABS braking operation. Filtering using a low pass filter such as a first order low pass filter may be used, however any filter may be applied to substantially eliminate at least a high frequency range of the traction motor speed signal and average wheel speed signals above a frequency range of the oscillations and to thereby generate a second motor speed and a second average wheel speed signal.

Initially, a plurality of variables are initialized (step 158). The step of initializing the plurality of variables has a plurality of substeps 160, 162, 164, 166, 168, 170, 172, as shown in more detail in FIG. 7. The first substep 160, sets a positive integer n equal to zero. An average wheel speed of the driven wheels at a time t(n), wherein initially a time t(0) is calculated (substep 162), and wherein the average wheel speed at t(0) is defined as AWS(0).

Figure 7:
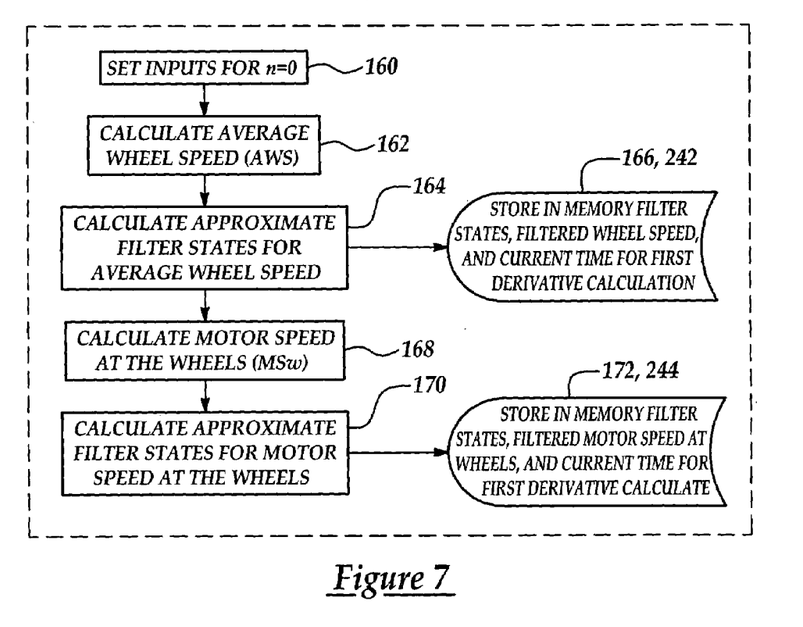
FIG. 7 is a flowchart that depicts initializing variables substeps of step 158 as shown in FIG. 6.

Next, at least one approximate filter state associated with a low pass filter is calculated to determine a filtered average wheel speed (FWS) at t(0) (substep 164), wherein the FWS at t(0) is defined as FWS(0). The at least one filter state associated with the low pass filter applied to the AWS(n) value determined at time t(0) is then stored in a memory location in the motor controller 68 for a use in a first computational cycle(step 242).

The FWS(0) is then stored (substep 166) in a memory location at time t(0) for use in a first derivative calculation during a first computational cycle.

Another variable MSw(0) representing an initial traction motor speed at the wheels is initialized (substep 168) by dividing an initially sensed motor speed (MS(0)) at time t(0) by a predefined gear ratio K.

Next, at least one approximate filter state associated with a low pass is calculated to determine a filtered motor speed at the wheels (FMSw) at t(0) (substep 170), wherein the FWS at t(0) is defined as FWS(O). The at least one calculated filtered state associated with the low pass filter applied to the MSw(n) value determined at time t(0) is then stored in a memory location in the motor controller 68 for a use in a first computational cycle(step 244).

The FMSw(0) variable is then stored (substep 172) in a memory location at time t(0) in the motor controller 68 for use in a first derivative calculation during a first computational cycle.

After the initialization step 158, n is set equal to a value of one (step 174). After n is set equal to one, a plurality of inputs are input into the motor controller 68 (step 176), wherein the inputs are selected from at least one of two wheel speeds Wh1(n), Wh2(n) sensed by wheel speed sensors 62, 64 at a time t(n), a motor speed MS(n) of the traction motor 26 sensed by the motor sensor 68 at a time t(n), and ABS operation data sent from the ABS controller 60 at a time t(n).

After receiving inputs as disclosed in step 176, the motor controller 68 then determines whether an ABS operation is occurring (step 178). If no ABS operation has occurred, then the motor controller increments n by one (step 180) and continuously monitors the inputs and repeats steps 176–180 until an ABS operation occurs (step 182).

Upon occurrence of an ABS operation, an average wheel speed (AWS(n)) at a time t(n) is determined by summing the speeds of each wheel sensed, Wh1(n), Wh2(n), and then dividing the sum by the number of wheels sensed. In the present embodiment that is an HEV having front wheel drive power configuration, each of the drive wheel speeds are measured and averaged. Thus, the two front wheel speeds Wh1(n), and Wh2(n) are summed and then the sum of the two speeds is divided by two (step 184).

The average wheel speed is then filtered by applying a low pass filter to the calculated AWS(n) to define a filtered average wheel speed FWS(n) (step 186).

At least one filter state associated with each filter are stored (steps 238, 240) in at least one memory location in the controller for use during a next computational cycle, wherein the plurality of filter states are values that are used to calculate filtered wheel speeds or filtered motor speeds in a filter calculation.

After determining FWS(n), acceleration of the average wheel speeds DWS is determined (step 188) by calculating the derivative of the FWS(n) with respect to a change in time $\Delta t$, wherein $\Delta t$ is the difference between a current time, t(n) and an earlier time t(n−1). Thus, DWS equals [FWS(n)−FWS(n−1)]/$\Delta t$. The FWS is then stored (step 190) in a memory location of the traction motor controller 68 for use in a next derivative calculation in a next computational cycle.

After the FWS is stored, a determination of the motor speed at the wheels (MSw(n)) at a time t(n) is determined (step 192) by dividing MS(n) by a predefined gear ratio K.

A filtered value FMSw(n) is then determined (step 194) by applying a low pass filter to the MSw(n) value determined at time t(n). At least one filter state associated with the low pass filter applied to the MSw(n) value determined at time t(n) is then stored in a memory location in the motor controller 68 for a use in a next computational cycle(step 240).

After determining FMSw(n), acceleration of the filtered motor speed DMSw is determined (step 186) by calculating the derivative of the FMSw(n) with respect to a change in time $\Delta t$, wherein $\Delta t$ is the difference between a current time, t(n) and an earlier time t(n−1). Thus FDMSw equals [FMSw(n)−FMSw(n−1)]/$\Delta t$. The FWS(n) is then stored (step 198) in a memory location of the traction motor controller 68 for use in a next derivative calculation.

If a proportional derivative (PD) controller is used to control torque, a speed error (SE) is then calculated (step 200) to determine the difference in the AWS(n) and the MSw(n).

A torque commanded value TCV is calculated (step 202) based on the speed error and at least one of the filtered motor acceleration (DMSw(n)), filtered average wheel acceleration (DWS), and a difference between the average wheel acceleration and the motor acceleration (DWS-DMSw).

More specifically, the proportional part of the TCV value is calculated step 202 by both multiplying the speed error by a predefined proportional gain, Pgain, of the proportional part of the proportional derivative controller and then by summing the result with a predefined or a variable derivative gain, Dgain, of the derivative portion of the proportional derivative controller multiplied by at least one of the following DMSw, DWS, and [DWS-DMSw].

In an alternative embodiment using a derivative controller, the traction motor is controlled to provide a motor output torque signal which is based on at least one of a derivative of the rotational motor speed at the drive wheels (motor angular acceleration), a derivative of the average wheels speed of the drive wheels (average wheel acceleration), and the difference between the motor angular acceleration and average wheel acceleration during an anti-lock braking operation.

However, if a derivative controller is used to control torque, then step 202 that calculates a speed error (SE) is not required.

Additionally, if a derivative controller is used to control torque, then a torque commanded value TCV is calculated (step 236) using at least one of the motor acceleration (DMSw(n)), average wheel acceleration (DWS), and a difference between the average wheel acceleration and the motor acceleration (DWS-DMSw).

More specifically, the TCV value is calculated by multiplying a predefined or a variable derivative gain, Dgain, of the derivative controller by at least one of the following DMSw, DWS, and [DWS-DMSw].

After the step 202 of calculating the TCV value is performed, an active motor damping limit (AMDL) optionally may be applied to the TCV value (step 204). The AMDL ranges between a positive AMDL and a negative AMDL wherein the positive AMDL and the negative AMDL may be different values. The step 204 of applying the AMDL to the TCV value further has substeps identical to those described with reference to step 96 shown in FIG. 3, thus, the steps 98, 100, 102, 104 used in FIG. 3 are similarly used to describe the substeps of step 204 shown in FIG. 6.

After completing step 204, an output current is then applied by the motor controller 68 to the motor 26 (step 206) to generate a desired output torque signal, preferably within either the positive or negative AMDL, effective to dampen unwanted oscillations in the driveline. After the TC is sent to the motor, a generated output signal is output by the traction motor 26 and the value n is incremented by one (step 208) steps 176–208 are repeated.

Alternative embodiments using the system and method of the present invention that do not rely on an occurrence of an ABS braking operation may be employed. In the alternative embodiments, the method performed employs an algorithm disclosing steps that are similar to those disclosed in FIGS. 2, 4 and 6 but that do not require that an ABS braking operation occur before performing the steps of the algorithm.

Thus, one alternative embodiment is similar to the method disclosed in FIG. 2 with the exception of eliminating the steps 84, and 86, respectively. Additionally, another alternative embodiment is similar to the method disclosed in FIG. 4 with the exception of eliminating the steps 128, 130 and 132, respectively. Another alternative embodiment is similar to the method disclosed in FIG. 6 with the exception of eliminating the steps 178, 180, and 182, respectively. Elimination of the respective steps associated with the ABS operation in FIGS. 2, 4 and 6 allows the motor controller 68 to continually monitor and generate an output torque signal from the traction motor 26 effective to dampen unwanted oscillations in the driveline regardless of whether an ABS operation occurs.

From the foregoing, it should be appreciated that several embodiments of a system and method for mitigating or actively damping oscillations in a driveline have been provided.

While a preferred exemplary embodiment has been presented in the foregoing detailed description, it should be understood that a vast number of variations exist and this preferred exemplary embodiment is merely an example, and it is not intended to limit the scope, applicability or configuration of the invention in any way. Rather, the foregoing detailed description provides those of ordinary skill in the art with a convenient guide for implementing a preferred embodiment of the invention and various changes can be made in the function and arrangements of the exemplary embodiment without departing from the spirit and scope of the appended claims.

What is claimed is:

1. A method for actively dampening driveline oscillations comprising a motor torque output driven by an electric machine in a motor vehicle having an antilock brake system comprising the steps of:
providing a motor torque output during a drive operation via the electric machine to drive at least two drive wheels on a motor vehicle; and
continuously controlling the motor torque output via a motor torque signal to effectively dampen driveline oscillations comprising the motor torque output during an antilock brake system operation that occurs when the antilock brake system is active at at least one of the at least two drive wheels.

2. The method of claim 1, wherein the step of continuously controlling the motor torque output comprises the steps of:
sensing a rotational speed of the motor;
calculating a rotational speed of the motor at the at least two drive wheels;
sensing rotational speeds of the at least two drive wheels;
calculating an average rotational speed of the at least two drive wheels.

3. The method of claim 2, wherein the step of calculating a rotational speed of the motor at the wheels further comprises the step of:
dividing the sensed motor speed by a predefined gear ratio that exists between the motor and the at least two drive wheels.

4. The method of claim 2, wherein the step calculating an average rotational speed of the at least two drive wheels further comprises the step of:
dividing a sum of the sensed speeds of each of the at least two drive wheels by the number of drive wheels sensed.

5. The method of claim 2, further comprising the step of:
inputting at least one of the calculated motor speed at the wheels and the average wheel speed of the at least two drive wheels into at least one of a proportional controller, a proportional-derivative controller, and a derivative controller to control the motor torque output signal.

6. The method of claim 1, wherein the driveline oscillations are caused by inertia of the motor.

7. The method of claim 1, wherein the motor is a traction motor.

8. A method for actively dampening driveline oscillations comprising a traction motor in a motor vehicle having an antilock brake system, comprising the steps of:
providing a torque output during drive operation via the traction motor that drives at least two drive wheels on a motor vehicle;
using at least one of a proportional controller, a proportional derivative controller, and a derivative controller to control the torque output via a torque output signal to effectively dampen driveline oscillations comprising the traction motor torque output during an antilock brake system operation that occurs when the antilock brake system is active at at least one of the at least two drive wheels.

9. The method of claim 8 further comprising the steps step of:
using the proportional controller to control the torque output signal, wherein the torque output signal is based on a speed error, wherein the speed error is a difference between the average wheel speed of the at least two drive wheels and rotational traction motor speed at the at least two drive wheels during an anti-lock braking operation.

10. The method of claim 8 further comprising the step of:
using the proportional derivative controller to control the torque output signal, wherein the torque output signal has a proportional portion based on a difference between the average wheel speed of the at least two drive wheels and rotational traction motor speed at the at least two drive wheels during an anti-lock braking operation, and a derivative portion that uses terms selected from at least one of a derivative of the rotational traction motor speed at the at least two drive wheels, a derivative of the average wheel speed of the at least two drive wheels, and a difference between the average wheel angular acceleration and the traction motor angular acceleration.

11. The method of claim 8 further comprising the step of:
using the derivative controller to control the torque output signal during an anti-lock braking operation, wherein the torque output signal is based on terms selected from at least one of traction motor angular acceleration, average wheel acceleration, and the difference between the traction motor angular acceleration and average wheel acceleration.

12. A method for actively dampening driveline oscillations comprising a traction motor in a motor vehicle having an antilock brake system comprising the steps of:
- providing a torque output via the traction motor that drives at least two drive wheels on a motor vehicle during a drive operation;
- calculating a rotational speed of the traction motor at the least two drive wheels;
- calculating an average rotational speed of the at least two drive wheels; and
- inputting at least one of the calculated motor speed at the wheels and the average wheel speed of the at least two drive wheels into at least one of a proportional controller, a proportional-derivative controller, and a derivative controller to control a torque output signal to adjust the traction motor torque output during an antilock brake system operation that occurs when the antilock brake system is active at at least one of the at least two drive wheels.

13. The method of claim 12, further comprising the step of:
- applying an upper positive active motor damping limit and a lower negative active motor damping limit to the torque output signal of the traction motor to limit amplitude of the torque output signal.

14. The method of claim 12 wherein the average rotational speed is a function of wheel speed signals sensed at the at least two drive wheels.

15. The method of claim 14 further comprising the step of:
- filtering the calculated average wheel speed of the at least two drive wheels to eliminate high frequency components of the average wheel speed of the at least two drive wheel speed signals.

16. The method of claim 14, further comprising the step of:
- filtering the calculated rotational speed of the traction motor at the at least two drive wheels to eliminate high frequency components of the rotational speed signal.

17. An active damping system to actively dampen driveline oscillations comprising a traction motor in a motor vehicle, the active damping system comprising:
- a traction motor that provides a torque output to at least two drive wheels on a motor vehicle during a drive operation;
- a traction motor controller; and
- an antilock brake system having an antilock brake system controller that cooperates with the traction motor controller to control the torque output to dampen unwanted driveline oscillations comprising the traction motor in the driveline during an antilock brake system operation that occurs when the antilock brake system is active at at least one of the at least two drive wheels.

18. The system of claim 17 wherein the unwanted driveline oscillations are caused by inertia of the traction motor.

* * * * *